United States Patent [19]

Berndtson

[11] 4,297,064
[45] Oct. 27, 1981

[54] STAPLE-NAIL FOR SECURING CEILING SUPPORT STRIP TO WALLBOARD

[76] Inventor: Gene A. Berndtson, Rte. 2, Box 145, Barrington, Ill. 60010

[21] Appl. No.: 109,546

[22] Filed: Jan. 4, 1980

[51] Int. Cl.³ .............................................. F16B 15/00
[52] U.S. Cl. ..................................... 411/470; 52/826; 411/471
[58] Field of Search ........................... 85/49, 13, 29, 28; 52/826; 411/470, 471, 459

[56] References Cited

U.S. PATENT DOCUMENTS

| | | | |
|---|---|---|---|
| 278,263 | 5/1883 | Orr, Jr. ............................... | 85/49 X |
| 669,025 | 2/1901 | Casgrain ............................. | 85/49 X |
| 1,083,559 | 1/1914 | Prowell ............................... | 85/29 |
| 2,323,362 | 7/1943 | Weiss .................................. | 85/49 X |

Primary Examiner—Ramon S. Britts
Attorney, Agent, or Firm—Leydig, Voit, Osann, Mayer & Holt, Ltd.

[57] ABSTRACT

A staple-nail fastener for nailing a ceiling support strip to a panel of wallboard which consists of a length of relatively hard steel wire bent into "U" shape to form long and short legs approximately parallel to one another, the long leg being approximately one-quarter inch to approximately three-eighths of an inch longer than the short leg. The long leg is chamfered to a sharp point, while the short leg presents a tip which is less sharp so that when the fastener is hammered into the strip the long leg readily penetrates the strip while the short leg resists penetration, serving as a fulcrum for the long leg to impart broadwise swinging movement thereto so that, as the long leg continues its penetrating movement, it regionally compresses the wallboard in the direction of the strip, until the short leg assumes a final position in which it lies flatly and snugly against the strip. In its preferred embodiment, the staple-nail is approximately one and one-half inch long and approximately one-half inch in average width.

4 Claims, 6 Drawing Figures

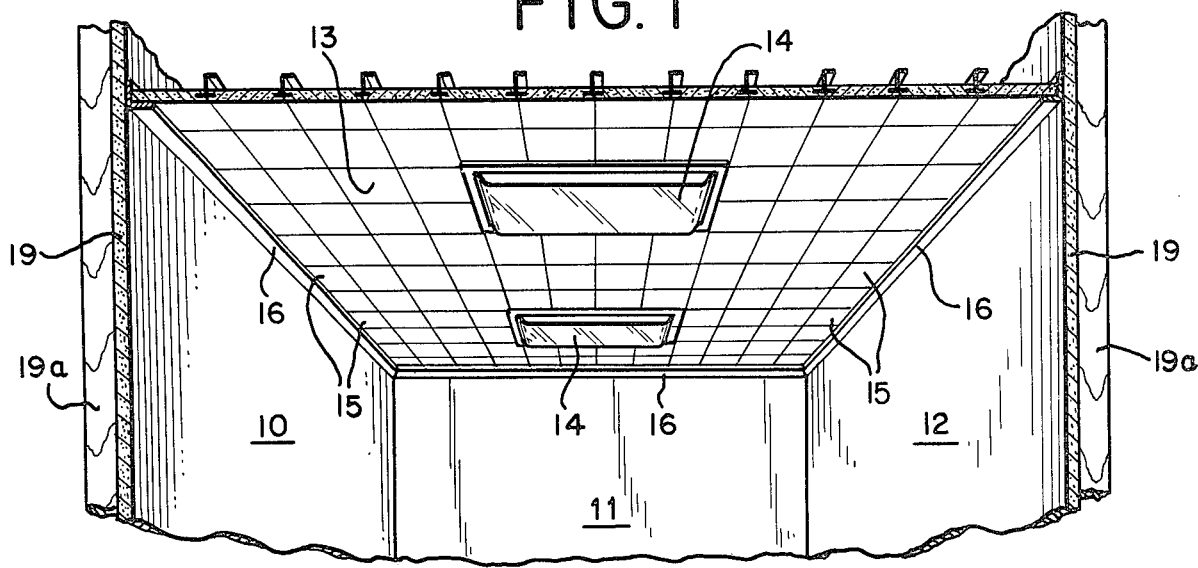
FIG. 1
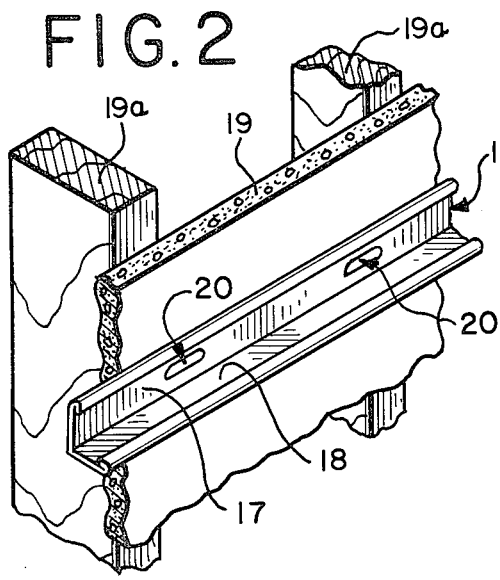
FIG. 2
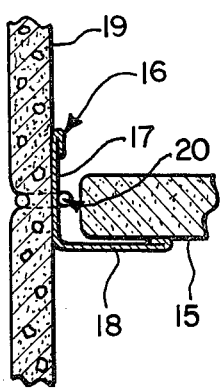
FIG. 3
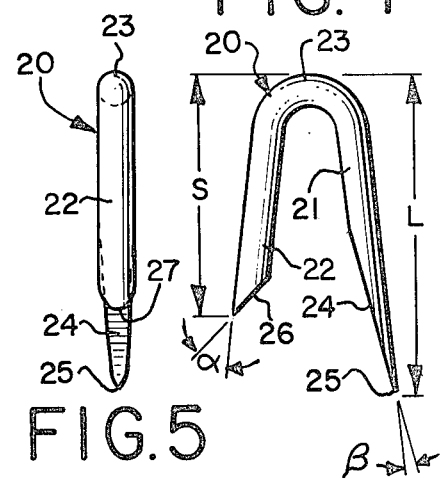
FIG. 4
FIG. 5
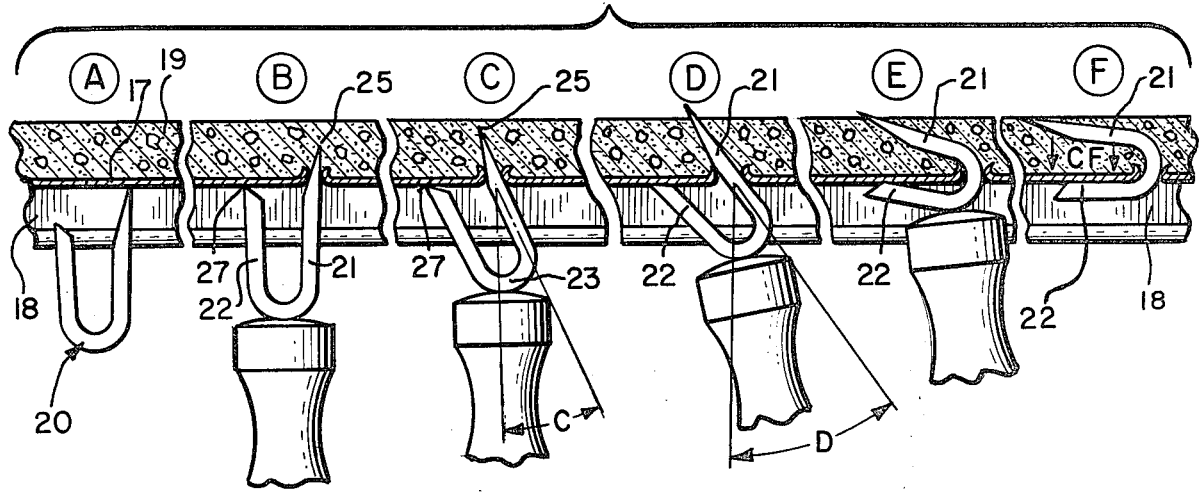
FIG. 6

STAPLE-NAIL FOR SECURING CEILING SUPPORT STRIP TO WALLBOARD

It is a common construction practice to line a room with wallboard formed of a layer of gypsum between two layers of paper commonly called "dry wall". It is further common practice to provide an acoustical ceiling made up of tiles supported in part by a light metal angle which encircles the room and which is secured directly to the wallboard. In fastening the light metal angle either staples or nails are commonly used. Both are unsatisfactory and as a result some attention has been given to the development of special fasteners, for example, the fastener disclosed by Lagaard in U.S. Pat. No. 2,197,750, but none of these special fasteners have proven to be sufficiently effective or economical to come into general usage. Efforts have been made to drive only one leg of a staple through the wall but this has been difficult and requires, at the minimum, a pre-piercing step.

It is accordingly an object of the present invention to provide a new device for mounting a ceiling supporting strip on wallboard, a device which I refer to as a staple-nail since it combines the appearance of a staple with the function of a nail whle being more easily driven and functionally superior to either of them.

It is another object to provide a staple-nail which has the appearance of a staple including a long leg which is chamfered to a sharp point and a short leg which is relatively blunt so that when the staple-nail is hammered into the strip the long leg readily penetrates the strip while the short leg resists penetration serving as a fulcrum for the long leg to impart broadwise swinging movement so that the long leg regionally compresses the wallboard in the direction of the strip. It is a related object to provide a staple-type fastener for fastening a ceiling support strip to a panel of wallboard which has great holding power distributed over a wide area on both the strip and the board but which is easily and quickly applied without requiring a pre-piercing step and without the second leg of the staple interfering with the piercing effect of the first.

It is a more specific object to provide a fastener for use with a gypsum type wallboard which does not depend upon friction for its holding power but which by reason of the broadwise swinging movement as the device is driven, places the wallboard more conveniently in compression to utilize the high compressive strength which is characteristic of wallboard of the gypsum-paper type. In effect, by reason of the swinging movement and change of direction, the staple-nail of the present invention acts as a freely rotative "C"-clamp tightly clamping the wallboard and strip together.

It is another object to provide a fastener which is easily applied and which signals the fact that it has been adequately driven as indicated by the flat seating of the short leg on the strip thereby insuring that the integrity of the board is preserved. This is to be constrasted with conventional nails or staples where "overdriving", in an effort to insure a reliable joint, often results in localized breakdown, or crumbling, of the gypsum material and hence hidden weakened support.

It is another object to provide a fastener which, while it undergoes a change in direction upon being driven, is, nevertheless, readily removable simply by applying a tool to the exposed leg of the fastener and a force which is in the direction to reverse the direction of original driving.

It is a general object to provide a fastener for securing a thin strip of soft steel to a panel of wallboard which is not only highly effective but which is economical, being manufactured and sold at a cost comparable to the cost of conventional staples.

Other objects and advantages of the invention will become apparent upon reading the attached detailed description and upon reference to the drawings in which:

FIG. 1 illustrates the type of ceiling installation to which the present invention is applicable.

FIG. 2 is a fragmentary perspective showing a panel of wallboard supported by spaced studs with a wall-angle mounted thereon for supporting the ceiling and forming a joint between ceiling and wall.

FIG. 3 is a fragmentary section taken, in elevation, through the joint between the ceiling and the wall.

FIG. 4 is a face view of a fastener constructed in accordance with the present invention and referred to as a staple-nail.

FIG. 5 is a view taken at right angles to FIG. 4.

FIG. 6 is a diagram consisting of a set of six stop motion views showing the position of the fastener at various stages during the course of application.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

To appreciate the function performed by the present invention, it is necessary to have in mind a typical suspended ceiling installation as shown in FIGS. 1-3. FIG. 1 shows the upper portion of a room having walls 10, 11 and 12 and a ceiling 13, which will normally include lighting fixtures 14, and which consists of square acoustical tiles made of light fibrous material. The central portion of the ceiling is suspended on a metal grid which in turn is supported by vertically extending hanger wires (not shown). The ceiling tiles around the edge, shown at 15 in FIG. 3, rest upon a wall angle or wall molding in the form of a thin "L"-shaped strip 16 of soft steel having vertical and horizontal portions 17, 18. It is the purpose of the present invention to secure the portion 17 of the angle on a panel of wallboard 19, which will be assumed to be of the gupsum-paper type, commonly referred to as "dry-wall", which is supported upon spaced studs 19a. In some installations the wall molding strip is also called upon to support the grid with consequent heavier loading.

In accordance with the present invention, the wall angle or molding strip is secured to the adjacent panel of wallboard by a staple-nail consisting of a length of relatively hard steel wire bent into "U" shape to form long and short legs approximately parallel to one another, the long leg being approximately one-quarter inch to approximately three-eighths of an inch longer than the short leg, the long leg being chamfered to a sharp point while the short leg is relatively blunt. Thus when the staple-nail is hammered into the strip the long leg readily penetrates the strip while the short leg resists penetration serving instead as a fulcrum for the long leg to impart broadwise swinging movement to the latter regionally compressing the wallboard in the direction of the strip until the short leg assumes a final position in which it lies flatly and snugly against the strip.

Thus referring to FIGS. 4 and 5, a staple-nail indicated at 20 has a long leg 21 and a short leg 22, the legs being interconnected at a bend or bridging portion 23. The long leg 21 is acutely chamfered along a surface 24 to a sharp point 25. The short leg 22 is more bluntly chamfered along the surface 26 to form a point 27 which has a less acute angle and is substantially less sharp than the point 25. Typically the included angle of the chamfered portion of the shorter leg, indicated at $\alpha$, may be on the order of 45 degrees while the included angle of the chamfered portion of the longer leg, indicated at $\beta$, may be on the order of only 10 degrees. These angles need not be precisely adhered to, however, and the angle $\alpha$ may be on the general order of 45 degrees, say, in the range of 35 to 55 degrees, while the angle $\beta$ may be any angle sufficiently acute to form a sharp, easily penetrating point.

The shorter leg 22 is preferably one-quarter to three-eighths of an inch shorter than the long leg, that is, the major dimension of the staple-nail, which may, in a typical case, be one and one-half inch. The chamfering indicated at 24, 26 is preferably and economically accomplished by a shearing operation which is the method employed for forming the points on the staples of conventional design.

With regard to the material of construction, I prefer to use relatively hard steel wire, wire having a hardness which lies between 70 and 90 on the Rockwell scale and which is, in any event, substantially harder than the soft steel conventionally employed for wall angles.

It is found that the overall size of the staple-nail which appears optimum for use in gypsum-paper wallboard and the commercial thicknesses normally supplied corresponds to a length of between one and one-quarter inch and one and five-eighths inch and an average width of one-half to five-eighths inch. In practicing the invention the average width should preferably be between approximately 30 and 45 percent of the length of the long leg. Expressing the length differential in percentage, the long leg should be longer than the short leg by an amount which is between approximately 15 and 27 percent of the length of the long leg.

The type of action which results from use of the above parameters in combination is set forth in FIG. 6 which shows, in stop motion, six stages in the movement of the fastener as it is pounded in by a conventional hammer, the six stages being indicated at A to F, respectively. In stage A the staple-nail is simply positioned with the long leg perpendicular to the steel strip 17 in the position of desired penetration.

With application of straight blows of the hammer, the sharp point 25, being of harder material, readily penetrates the strip until the blunter point 26 makes contact as shown at B.

After contact occurs at the shorter leg, the tip thereon acts as a fulcrum. Such tip may indent the strip slightly in forming the fulcrum for initiating the rotary movement but is not sufficiently sharp as to actually penetrate the strip. The result is that continued hammer blows rock the staple-nail bodily in a counterclockwise direction through an angle as shown at C.

As the hammering continues the fastener progressively rocks into the condition shown at D. By chamfering the short leg at a relatively large included angle on the general order of 45 degrees, and by locating such chamfer on the "inside" surface of the leg, the leg, when in the illustrated cocked position, presents a relatively flat, and in any event "unpointed", surface to the strip to permit relative sliding movement along the strip as the staple-nail continues to be hammered in. As the staple-nail swings with changing direction, the angle at which the blows are applied is preferably changed in step with the movement, the preferred direction of the hammer blow at this stage being approximately one-third to one-half of the angle of swing of the fastener.

Movement continues to the condition illustrated at E where the staple-nail is positioned almost at right angles for the final blows of the hammer which continue to be applied at an angle with respect to the surface of the strip. At stage E it is apparent that the long leg of the staple-nail has swept progressively broadwise compacting the engaged region of the panel in the direction of the strip. To facilitate the sweeping movement and entry of the bend or bridging portion into the metal and wall board, the bridging portion is in the form of a unidirectional curve which merges smoothly with the straight legs 21, 22.

Finally, as shown at F, the short leg 22 assumes a tight position in which it lies flatly and snugly against the strip 17, with the long leg 21 being embedded in the wallboard in a position which is parallel thereto, applying a compressive force indicated by the arrows CF which is analogous to that exerted by a "C" clamp. No reliance is placed upon pure friction as in the case of a conventional nail.

When the short leg lies flat against the strip, this signifies to the operator that maximum holding power has been developed and that further hammering is neither necessary nor productive. Thus hammering is stopped short of the point of overstress. This is to be contrasted with the "overdriving" which frequently occurs where a conventional nail or staple is driven in too hard by an overzealous installer which may result in crushing or crumbling of the gypsum material, and hence weaker support, which is hidden and provides no telltale.

The tests show that the present staple-nail has a holding power up to several times greater than the holding power of a conventional nail or staple applied in the conventional way. The holding power, moreover, is distributed over a larger region resulting in a substantial multiplication of holding strength, enabling fewer fasteners to be employed per lineal foot of wall angle while still achieving highly reliable support. The present fastener seems to take advantage of the inherent compressive strength of the gypsum-paper type board, while avoiding those modes of stress in which such board is inherently weak.

While a typical installation cycle has been shown and described in six separate steps, it will be understood that the action has been described for purposes of understanding only and that in an actual installation there is a smooth progression between step A and step F, with only a few blows of the hammer being required to produce the final result. As compared to driving conventional staples where both legs penetrate, the driving force is greatly reduced since, as in the case of a nail, penetration of only a single driving element is required.

Staple-nails of the present type can be driven in quick succession and the installer quickly acquires the knack of angling the hammer slightly during the central portion of the driving sequence so that installation becomes automatic and without conscious thought.

While the illustrated design, discussed above, is distinguished by a chamfer on the "inside" surface of the long leg, the invention is not limited thereto and, if desired, the chamfer may be located on the outside surface of the leg or, indeed, on either of the two side surfaces.

Removal, when necessary may be achieved by inserting the jaws of a nipper or similar tool between the short leg and the metal strip, preferably in the region shown "open" in FIG. 6-E, to loosen the fastener, following which it is gripped and rocked back into straight position while applying a pulling force.

It will be apparent to one skilled in the art that the staple-nail which forms the substance of the present invention, in addition to possessing the above features, is highly economical being formed out of readily available wire stock on the same type of machine which is used to manufacture conventional staples but with the machine adjusted to produce the differential sharpness and the differential leg length. The wire gauge may be within the range of 8–10, wire of lighter gauge being preferred consistently with development of adequate piercing force and clamping strength. While the invention has been described in connection with its use in wallboard of the common gypsum or "dry wall" type, it will be understood that the term wallboard is not intended to be limited thereto and the invention may be practiced with advantage using penetrable wallboard of specifically different composition, for example, wallboard of the fibrous type, in equal or greater thickness.

I claim:

1. As an article of manufacture, a staple-nail for nailing a thin strip of soft steel to a panel of wallboard comprising a length of relatively hard steel wire bent into "U" shape to form substantially straight long and short legs approximately parallel to one another joined by a bridging portion, the long leg having a length of substantially one and one-quarter to substantially one and five-eighths inch and which is approximately one-quarter inch to approximately three-eights of an inch longer than the short leg, the long leg being chamfered to an acute point, the short leg providing a tip which is chamfered on its inner surface to a less acute point so that when the staple-nail is hammered into the strip the long leg readily penetrates the strip while the short leg resists penetration serving as a fulcrum for the long leg to impart broadwise swinging movement and the bridging portion being in the form of a unidirectional curve which merges smoothly with the straight legs to that as the long leg continues its penetrating movement is regionally compresses the wallboard in the direction of the strip until the short leg assumes a final position in which it lies flatly and snugly against the strip.

2. As an article of manufacture, a staple-nail for nailing a thin strip of soft steel to a panel of wallboard comprising a length of relatively hard steel wire bent into "U" shape to form straight long and short legs approximately parallel to one another joined by a bridging portion, the bridging portion being in the form of a unidirectional curve which merges smoothly with the straight legs, the long leg having a length which is substantially one and one-quarter to substantially one and five-eighths inch and which is approximately one-quarter inch to approximately three-eights inch longer than the short leg, the long leg being chamfered to an acute point, the short leg being chamfered to a less acute point, the chamfer on the short leg being on the inner surface of the leg.

3. As an article of manufacture, a staple-nail for nailing a thin strip of soft steel to a panel of wallboard comprising a length of steel wire approximately ten gauge in thickness and having a hardness on the order of 70 to 90 on the Rockwell scale bent into "U" shape to form substantially straight long and short legs approximately parallel to one another having their axes spaced by approximately one-half inch, the legs being joined by a bridging portion in the form of a unidirectional curve which merges smoothly with the straight legs, the long leg being approximately one-quarter inch to approximately three-eights of an inch longer than the short leg and having a length on the order of one and one-half inch, the long leg being chamfered to a sharply acute point, the short leg being chamfered on its inner side to a point which is relatively blunt.

4. As an article of manufacture, a staple-nail for nailing a thin strip of soft steel to a panel of wallboard comprising a length of relatively hard steel wire bent into "U" shape to form long and short legs approximately parallel to one another, the long leg having a length within the range of substantially one and one-quarter inch to substantially one and five-eighths inch, the axial width of the staple-nail being between 30 and 45 percent of the length of the long leg, the long leg being longer than the short leg by an amount which is between 15 and 27 percent of the length of the long leg, the long leg being chamfered to a sharply acute point, the short leg providing a tip which is chamfered on its inner surface to a less acute point so that when the staple-nail is hammered into the strip the long leg readily penetrates the strip while the short leg resists penetration serving as a fulcrum for the long leg to impart broadwise swinging movement for regional compaction of the wallboard as the long leg continues to penetrate into the wallboard until the short leg assumes a final position in which it lies flatly and snugly against the strip.

* * * * *